United States Patent [19]
Paoli

[11] 3,958,763
[45] May 25, 1976

[54] MEAT SEPARATOR MACHINE WITH TEMPERATURE REDUCING MEANS

[76] Inventor: Stephen A. Paoli, c/o Stephen Paoli Manufacturing Company, 2531 Eleventh St., Rockford, Ill. 61108

[22] Filed: July 5, 1974

[21] Appl. No.: 486,171

[52] U.S. Cl. .................................. 241/54; 241/68
[51] Int. Cl.² ...................................... B02C 23/24
[58] Field of Search ............... 241/54, 56, 65, 47, 241/48, 55, 68, 69, 91, 93

[56] References Cited
UNITED STATES PATENTS

| | | | |
|---|---|---|---|
| 2,494,107 | 1/1950 | Ryan | 241/56 |
| 3,552,461 | 1/1971 | Paoli | 241/68 |
| 3,856,218 | 12/1974 | Harmon et al. | 241/56 |

Primary Examiner—Granville Y. Custer, Jr.
Attorney, Agent, or Firm—Wolfe, Hubbard, Leydig, Voit & Osann, Ltd.

[57] ABSTRACT

An improved machine for mechanically separating comminuted meat from a coarse agglomeration of soft and hard tissues derived from crushing or grinding a meat animal carcass, poultry, fish, shellfish, or parts thereof. The machine is provided with means for sustaining a flow of cooling air from its exterior through its interior as an incident to operation, thereby reducing the temperature of the product which is produced.

9 Claims, 6 Drawing Figures

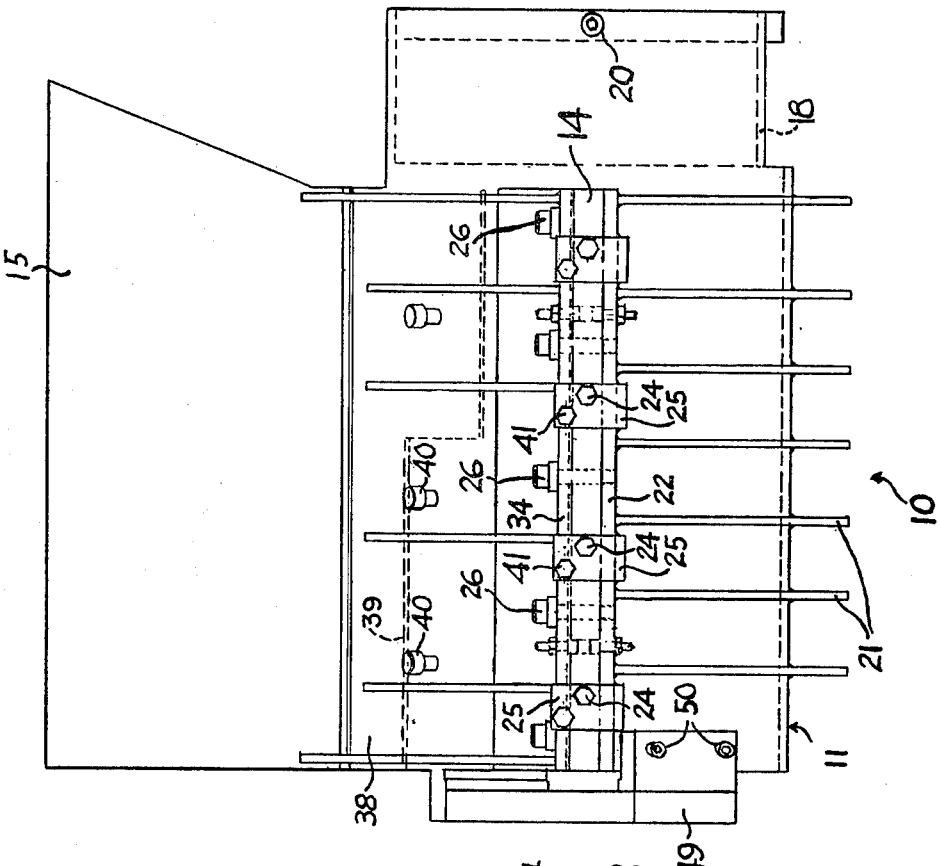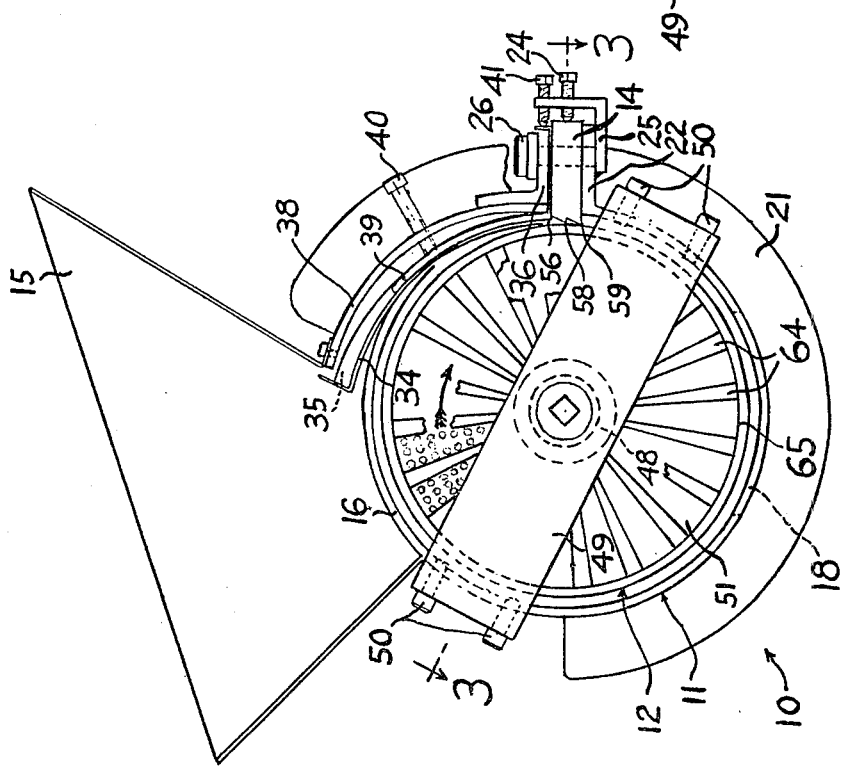

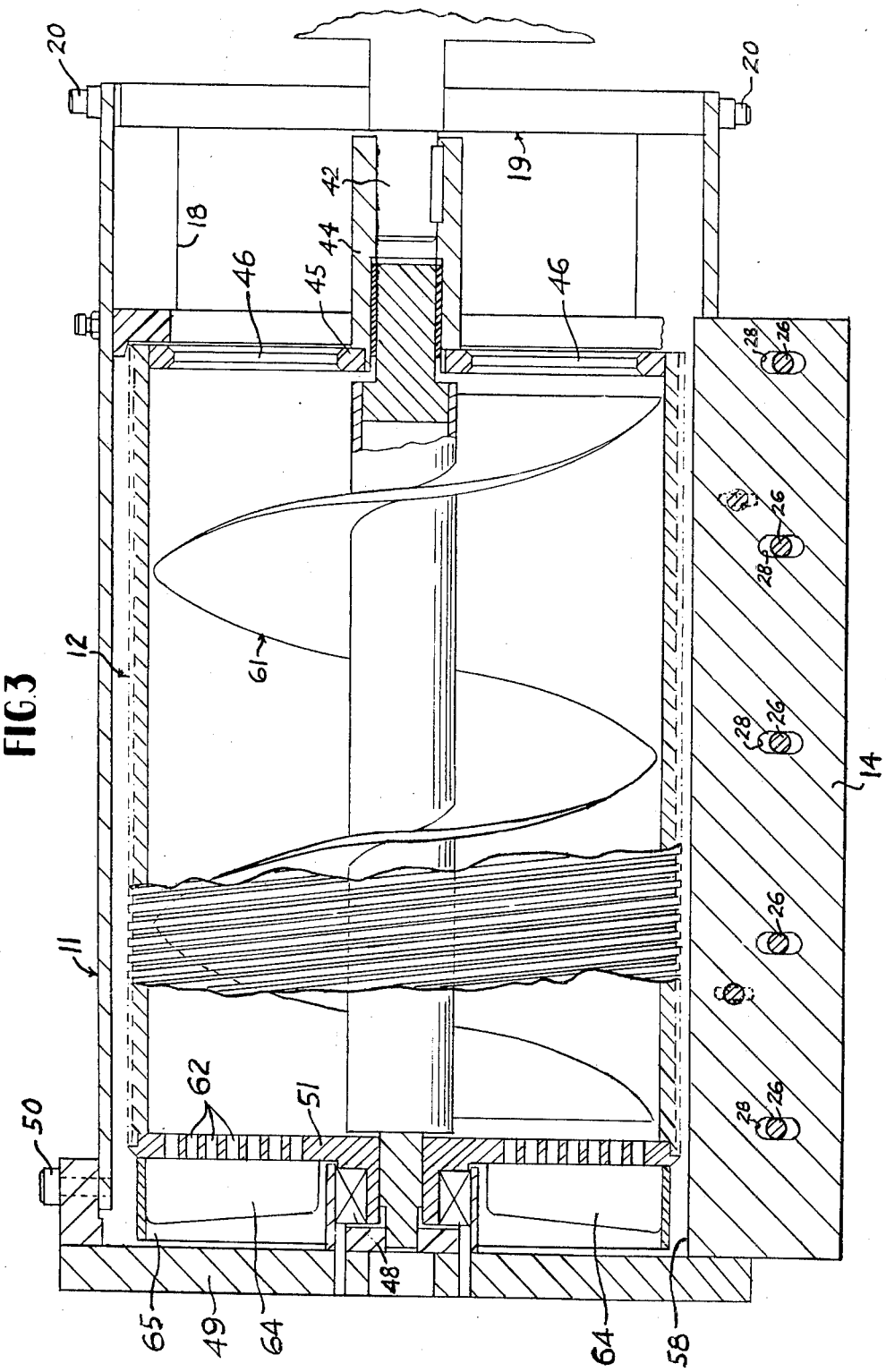

MEAT SEPARATOR MACHINE WITH TEMPERATURE REDUCING MEANS

DESCRIPTION OF THE INVENTION

The present invention relates in general to food processing machinery and, more specifically, to an improved mechanical separator machine adapted to process a coarse agglomeration of soft and hard tissues derived from crushing or grinding a meat animal carcass, poultry, fish, shellfish, or parts thereof. The machine is adapted to separate the edible meat from the harder tissues and to reduce the temperature of the edible meat as an incident to operation.

The present invention represents an improvement over the machines disclosed and claimed in my prior U.S. Pats., No. 3,266,542 issued Aug. 16,1966, U.S. Pat. No. 3,524,487 issued Aug. 18, 1970, and U.S. Pat. No. 3,659,638 issued May 2, 1972.

Mechanical separator machines of the foregoing type have met with increasing usage in the food industry for processing a variety of raw materials such as meat animal and poultry carcasses, whole fish and fish skelatals, shellfish, and parts of these items. In many instances, the raw material is first passed through a coarse grinding machine where it is crushed and ground into a coarse agglomeration or hard and soft tissues. The substantial frictional effect of such action tends to raise the temperature of the raw material prior to its introduction to the mechanical separator machine. The latter separates out the edible meat as an end product and at the same time ejects the harder tissues as waste. The action of the separator machine is also accompanied by a substantial frictional effect which tends to increase the temperature of both the edible meat end product and the waste.

Certain mechanical separator machines of the general type referred to above are adapted to operate without an external grinding machine. These machines accept the raw material directly and perform the crushing or grinding action entirely within the separator. This action also produces substantial friction and tends to increase the temperature of the end product and the waste.

With the foregoing in mind, it is the general object of the present invention to provide a mechanical separator machine of the character set forth above and adapted to reduce substantially the temperature of the edible meat which it produces as an end product.

Another object of the invention is to provide a mechanical separator machine of the above type having means for sustaining a flow of cooling air from the exterior of the machine and through its interior as an incident to operation, thereby reducing substantially the temperature of the edible meat end product.

A further object of the invention is to provide a mechanical separator machine of the above nature and adapted to process a coarse agglomeration of soft and hard tissues from a meat animal or poultry carcass or from fish or shellfish, or parts thereof, separating the edible meat from the harder tissues and delivering it in comminuted form while reducing its temperature, and ejecting the harder tissues as waste also while reducing its temperature.

Still another object of the invention is to provide a mechanical separator machine of the character set forth and adapted to produce comminuted meat with an end product temperature lower than its initial temperature.

A further object is to provide a machine of the foregoing type which may be quickly assembled and disassembled for cleaning and maintenance, and which will meet the high standards required of food processing machinery.

Other objects and advantages will become apparent from the following description, taken together with the accompanying drawings, in which:

FIG. 1 is an end view of an illustrative machine embodying the present invention.

FIG. 2 is a side elevational view of the illustrative machine of FIG. 1.

FIG. 3 is an enlarged, fragmentary horizontal sectional view of the rotor of the machine of FIG. 1, taken in the plane of the line 3—3.

Figure 4:
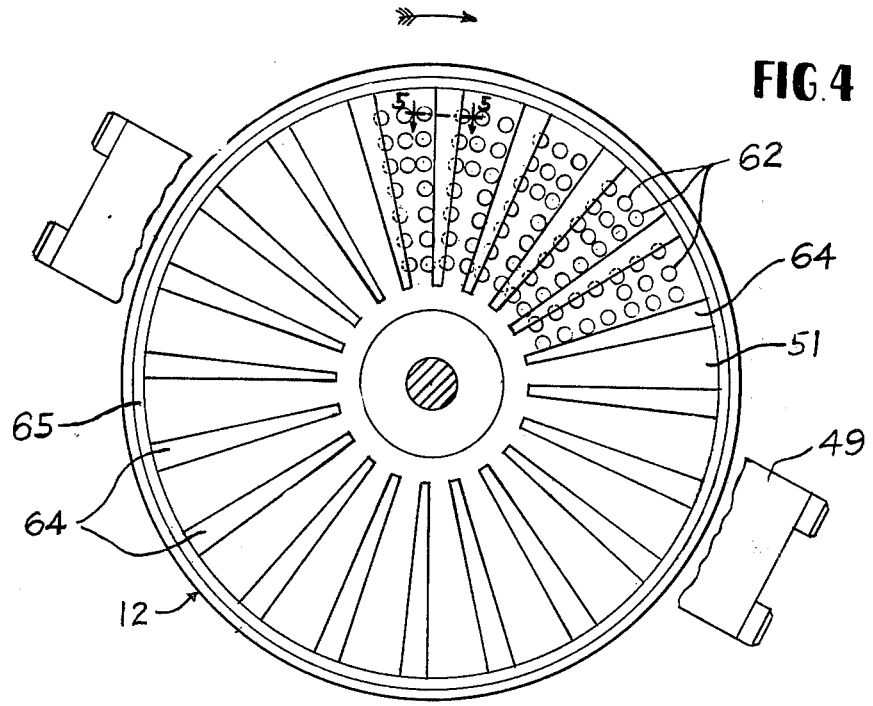
FIG. 4 is an end elevational view of the rotor of the illustrative machine shown in FIG. 3.

While the invention is susceptible of various modifications and alternative constructions, a certain illustrative embodiment has been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

Figure 3A:
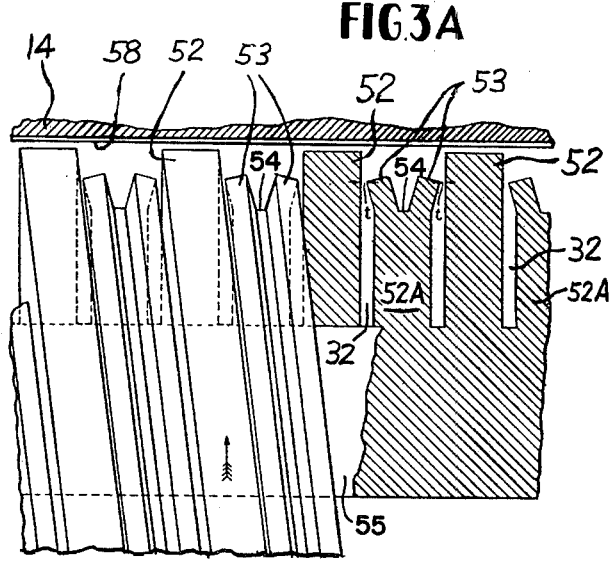
FIG. 3A is an enlarged fragmentary sectional view taken longitudinally of the rotor, detailing the helical cutting elements thereof and their position in relation to the pressure bar.

Referring more specifically to FIGS. 1 and 2, the invention is there examplified in an illustrative mechanical separator machine 10. The machine 10 is somewhat similar in organization to the mechanical separator machines disclosed in my prior U.S. Pats. Nos. 3,266,542, 3,524,487, and 3,659,638, supra. The machine comprises a generally cylindrical casing 11 containing a power driven rotor 12 and a cooperating pressure bar 14. In the present instance, raw material in the form of a coarse agglomeration of hard and soft meat animal tissues is fed into the machine via hopper 15 and feed opening 16 in the top of the casing. It is thereupon separated into high quality edible meat, and waste. The edible meat passes into the rotor and out via an aperture 18 in the casing near the driven end of the rotor. The waste material comprising bone, sinew, cartilage, and stringy connective tissue, is trapped on the outer periphery of the rotor and discharged adjacent the outboard end thereof, at the left-hand end of the pressure bar 14 as viewed in FIGS. 2 and 3.

The casing 11 (FIGS. 1–3) has in this instance a generally cylindrical tubular configuration and is mounted cantilever fashion on drive unit 19 (not shown in detail). It is secured to the latter as by means of cap screws 20. Longitudinally spaced arcuate stiffener ribs 21 reinforce the casing against deflection due, for example, to concentrations of lateral thrust in the vicinity of the pressure bar.

The pressure bar 14 (FIGS. 1 -3) is mounted on a base flange 22 which turns outwardly from the casing wall. The flange 22 is situated so that the pressure bar 14 will be disposed with its medial plane in or near coincidence with the horizontal axial plane of the rotor 12. The pressure bar 14 may be adjusted for clearance with the rotor as by means of adjusting screws 24 mounted in brackets 25 fixed to the base flange. The pressure bar is secured in adjusted position as by means of hold-down bolts 26 which pass through clearance slots 28 in the bar and engage tapped holes in the base flange.

The machine 10 is equipped with a regulator plate assembly (FIG. 1) adapted to control the feeding of raw material to the rotor 12 and pressure bar 14. This assembly is generally similar to the one disclosed in my prior U.S. Pat. No. 3,552,461, to which reference may be made for further details. It will suffice for present purposes to note that this assembly comprises a regulator plate 34 of concave form which extends from the pressure bar 14 and diverges outwardly and upwardly toward the feed opening 16 at the base of the hopper. The plate 34 includes an arcuate pocket 35, shown in profile in FIG. 1, driven end of the rotor, providing additional clearance for receiving the chunks of raw material from the hopper. The regulator plate 34 is clamped between mounting flange 36 of an arcuate segment of the casing wall 38 and the top of the pressure bar 14. The plate 34 is reinforced by a backup plate 39 which, in turn, may be adjusted by screws 40 in the casing wall 38. The clearance between the regulator plate 34 and the rotor 12 may be varied by means of adjusting screws 41 carried by the brackets 25. The plate 34 casing wall 38 may be retained in place by means of the hold-down bolts 26.

As noted earlier herein, the rotor 12 is journaled in the casing 11 (FIGS. 1 and 3) and is power driven from output shaft 42 of the drive unit 19 which may, for example, be a motor driven reduction gear. The inboard end of the rotor adjacent the drive unit 19 is supported by means of hub 44 and end plate 45, the latter having a plurality of large meat discharge apertures 46. The outboard end of the rotor is journaled in a main support bearing 48 mounted on a diametrical bracket 49 which extends across the end of the casing. The bracket 49 is detachably secured to the casing 11 as by means of cap screws 50. The outer end of the rotor 12 is covered and centered in the bearing 48 by means of end plate or cap 51.

The rotor 12 in this instance happens to be fashioned with a plurality of helical cutting elements 52, 52A disposed in axially spaced relation on its periphery (FIGS. 3, 3A) after the manner disclosed and claimed in my prior U.S. Pat. No. 3,659,638, supra. The elements 52 are of rectangular cross section and of somewhat greater diameter than the elements 52A. The outer peripheral portions of the latter are each formed with a pair of ribs 53 diverging from each other and separated by a blind groove 54. Each rib 53 thus defines a constricted entrance or throat $t$, which may be on the order of 0.008 inch in width, in the open groove or passage 32 between itself and its adjacent cutting element 52. The cutting elements 52, 52A are unitary with a plurality of longitudinally extending circumferentially spaced lands 55 in the rotor. Communication between the pressure pocket defined by the radial extremities of the ribs 53 of each cutting element 52A and the radially extended portions of the adjacent cutting elements 52, and the rotor interior, occurs via the constricted throats $t$, their associated passages 32 and the spaces between the lands 55.

The pressure bar 14 and regulator plate 34 comprise a pressure means cooperating with the cutting elements 52, 52A of the rotor 12. The lower portion of the regulator plate 34 closest to the pressure bar 14 has an apex 56 which may have a clearance with the rotor approximately equal to or slightly greater than that of the pressure bar. The latter, in this instance, is of the double pocket type and includes two apexes 58, 59 which may, for example, be set for a rotor clearance on the order of 0.010 inch. Upon rotation of the rotor in a clockwise direction (as viewed in FIGS. 1 and 4) the raw material is spread out on the corrugated peripheral surface of the rotor 12 by the regulator plate. With further rotation of the rotor, the raw material is repeatedly squeezed between the periphery of the rotor and the respective apexes 56, 58 and 59 of the regulator plate and the pressure bar. The edible meat, being slightly fibrous but quite plastic, is thereby cut and extruded through the initially constricted passages 32 between the cutting elements 52, 52A, thence passing into the interior of the rotor 12. The waste in the form of bone, cartilage, sinew and other hard tissues is trapped on the outer periphery of the rotor and pushed along the pressure bar 14 toward the outboard end of the rotor by the helical cutting elements 52, 52A. The waste is thus discharged to a collecting means at the outboard end of the rotor and pressure bar.

The edible meat which enters the rotor 12 is extracted therefrom by means of the fixed auger 61 (FIG.3) which is held against rotation as by means of a square socket in the bracket 49. The auger 61 guides the incoming edible meat axially of the rotor to the discharge apertures 46 at the inboard end of the rotor. From here it drops down through the casing discharge aperture 18 to an appropriate collecting means.

In keeping with the objects set forth earlier herein, provision is made for reducing the temperature of the edible meat end product of the machine 10 by sustaining a flow of cooling air from its exterior through its interior as an incident to operation of the machine. In accordance with one aspect of the invention, this is accomplished by forming the rotor end cap 51 with a plurality of air passages 62 (FIGS. 1,3,4) communicating between its exterior and interior faces and by utilizing the fixed auger 61 to perform the additional function of serving as an air impeller within the rotar 12. Thus as the rotor rotates, air is drawn into the rotor through the passages in the end cap 51, moved axially of the rotor, and expelled therefrom via the meat discharge apertures 46 and 18 at the driven end of the machine. The cooling air enters the rotor 12 at its outboard end which is its hotest portion, passing axially therethrough and extracting heat from the rotor 12, the auger 61, the edible meat therein, and even the waste on the exterior of the rotor adjacent to the pressure bar 14.

In accordance with another aspect of the invention, provision is made in the machine 10 for increasing the cooling capacity of the machine still further as an incident to its operation. This is accomplished by mounting a plurality of air scoop elements or vanes 64 on the exterior face of the rotor end cap 51. The vanes 64 (FIGS. 1,3,4,5) are set generally radially of the end cap with their leading edges inclined in the direction of rotation, so as to sustain a positive flow of cooling air into and through the cooling passages 62 in response to rotation of the rotor. The vanes 64 are secured to the end cap 51 as by welding. Their radial outer extremities are also fixed as by welding to a surrounding shroud ring 65 mounted on the end cap 1 adjacent its outer periphery. The shroud ring also serves to prevent waste material from being picked up and thrown about by the vanes 64. The radially inner extremities of the vanes 64 terminate adjacent to the hub of the end cap 51 with sufficient clearance to avoid the fixed bearing that supports the outboard end of the rotor. This places the vanes in the annular space between the support bearing and the outer peripheral portion of the end cap 51.

Figure 5:
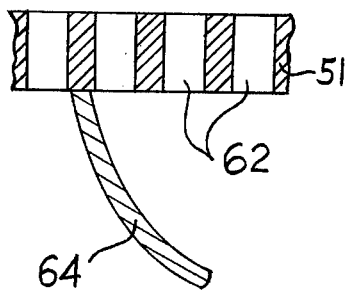
FIG. 5 is an enlarged fragmentary transverse sectional view taken in the plane of the line 5—5 in FIG. 4

The vanes 64 may have a variety of specific configurations. In the present instance, they are somewhat wider at their radially outer extremities than at their inner extremities. They may be flat in cross section or, as shown in FIG. 5, may have a laterally bowed cross section with their concave sides facing in the direction of rotation.

In operation, as the machine mechanically separates the edible meat from the waste material, the rotation of the rotor causes the vanes 64 to force a substantial flow of ambient air through the cooling passages 62 into the rotor, thence axially of the rotor 12, and out through the meat apertures 46, 18. This flow of cooling air is substantially greater than, and cumulative with respect to, the flow of air induced by the fixed auger 61. Consequently, in many cases a temperature rise in the end product and also in the waste is not only offset but the temperature is actually reduced. This avoids the undesirable build-up of bacterial count in the end product and enhances its value. It also avoids bacterial build-up in the waste material, thereby upgrading the waste and increasing its value.

The performance of a mechanical separator machine similar to the machine 10 has been demonstrated in recent tests using, as raw material, beef bones with residual meat delivered in fragmented form by a coarse grinder. In a machine with a conventional rotor end cap having no air passages or vanes, the temperatures of the material being processed were as follows:

| | |
|---|---|
| Temperature Entering Grinder: | 45–50°F |
| Temperature as Discharged from Grinder: | 85°F |
| Temperature Edible Meat as Discharged from Separator: | 90–98°F |
| Temperature Waste as Discharged from Separator: | 100–115°F |

In the same machine, equipped with an end cap with cooling passages and exterior vanes, the temperature of the material being processed was as follows:

| | |
|---|---|
| Temperature Entering Grinder: | 45–50°F |
| Temperature as Discharged from Grinder: | 85°F |
| Temperature Edible Meat as Discharged from Separator: | 69–70°F |
| Temperature Waste as Discharged from Separator: | 72–74°F |

It will be noted that in this instance, not only was temperature build-up in the edible meat end product and the waste avoided, but the temperature of both was actually reduced by as much as 16°F, and 13°F, respectively.

I claim as my invention:

1. In a machine for mechanically separating comminuted edible meat from fragments of hard tissue such as bone, sinew and cartilage, said machine having a hollow, power driven rotor with helical cutting elements and initially constricted helical passages communicating with the interior thereof, and a pressure bar extending axially of said rotor spaced from the periphery thereof, the combination comprising:
   a. an end cap on said rotor having a plurality of air passages extending therethrough and communicating with the rotor interior; and
   b. a plurality of air scoop elements fixed to the outer face of said end cap and adapted to sustain a flow of cooling air through said air passages and rotor as an incident to rotation of the latter.

2. The combination defined in claim 1 wherein said air scoop elements comprise a plurality of vanes disposed generally radially of said end cap and inclined toward the direction of rotation of said rotor.

3. The combination defined in claim 2 wherein said rotor includes a support member at one end thereof having meat discharge apertures therein and said vanes sustain a flow of cooling air through the air passages of said end cap, into said rotor, and out through said meat discharge apertures.

4. The combination defined in claim 2, wherein said end cap has a hub journaled within a support bearing and said vanes are disposed in the annular space between said support bearing and the outer peripheral portion of said end cap.

5. The combination defined in claim 1 including a shroud ring fixed to said end cap in surrounding relation with the radial extremities of said air scoop elements.

6. In a machine for mechanically separating comminuted edible meat from fragments of hard tissue such as bone, sinew and cartilage, said machine having a hollow, power driven rotor with helical cutting elements and initially constricted helical passages communicating with the interior thereof, and a pressure bar extending axially of said rotor spaced from the periphery thereof by an amount not substantially greater than the initial constriction of said helical passages, the combination comprising:
   a. a support member at one end of said rotor having meat discharge apertures therein;
   b. an end cap at the opposite end of said rotor having a plurality of air passages therein communicating with the interior of said rotor;
   c. a fixed auger within said rotor adapted to sustain, as an incident to rotation of said rotor, a flow of cooling air through said air passages into said rotor and out via said meat discharge apertures;
   d. a plurality of vanes fixed to the outer face of said end cap;
   e. each said vane being disposed generally radially of said end cap and inclined toward the direction of rotation of said rotor;
   f. whereby, as an incident to rotation of said rotor, a further flow of cooling air takes place through said air passages into said rotor and out via said meat discharge apertures.

7. The combination defined in claim 6 including a shroud ring fixed to said end cap in surrounding relation with the radially outward extremities of said vanes.

8. The combination defined in claim 7, wherein said end cap has a hub journaled within a support bearing and said air passages and said vanes are disposed in the annular space between said support bearing and said shroud ring.

9. The combination defined in claim 7, wherein the radial extremities of said vanes are fixed to said shroud ring.

* * * * *